(12) United States Patent
Beirakh

(10) Patent No.: US 8,580,908 B2
(45) Date of Patent: Nov. 12, 2013

(54) METHOD AND CHEMICAL COMPOSITION FOR RECLAIMING OF CURED ELASTOMER MATERIALS

(71) Applicant: Innovert Investments A.L. Ltd., Yavne (IL)

(72) Inventor: Lev Beirakh, Yavne (IL)

(*) Notice: Subject to any disclaimer, the term of this patent is extended or adjusted under 35 U.S.C. 154(b) by 0 days.

(21) Appl. No.: 13/669,238

(22) Filed: Nov. 5, 2012

(65) Prior Publication Data

US 2013/0096216 A1    Apr. 18, 2013

Related U.S. Application Data

(63) Continuation of application No. 13/059,642, filed as application No. PCT/IL2009/000808 on Aug. 17, 2009, now Pat. No. 8,304,458.

(30) Foreign Application Priority Data

Aug. 18, 2012 (IL) .......................................... 193513

(51) Int. Cl.
C08G 77/20    (2006.01)
C08G 77/12    (2006.01)

(52) U.S. Cl.
USPC ............................................ 528/40; 528/176

(58) Field of Classification Search
USPC ............................................ 521/40; 528/176
See application file for complete search history.

(56) References Cited

U.S. PATENT DOCUMENTS 8,304,458 B2 * 11/2012 Beirakh .......................... 521/40

* cited by examiner

*Primary Examiner* — Terressa Boykin
(74) *Attorney, Agent, or Firm* — Daniel J. Swirsky; AlphaPatent Associates Ltd.

(57) ABSTRACT

Reclaiming cured elastomer material by mixing the cured elastomer as crumbs or chips with a devulcanization-aiding chemical composition, and devulcanizing the cured material by applying a shear-stress deformation to the mixture of the crumbs or chips with a devulcanization-aiding chemical while performing a mechanical disintegration of the cured elastomer into fine-ground crumbs under controllable temperature not exceeding about 90 degrees C., where the chemical composition includes a first agent promoting scission of sulfide bonds of free radicals formed under the shear-stress deformation, which is selected from amines and sulfides and their derivatives, a second agent providing the pre-set acidity during the process inhibiting recombination of sulfide bonds, which is selected from organic acids and their anhydrides, a third agent contributing to fast stabilization of the free radicals, which is selected from oxidants, and a fourth agent promoting redox reaction, which is selected from oxides of metals with variable valence.

20 Claims, No Drawings

METHOD AND CHEMICAL COMPOSITION FOR RECLAIMING OF CURED ELASTOMER MATERIALS

CROSS-REFERENCE TO RELATED APPLICATIONS

This application is a continuation of U.S. patent application Ser. No. 13/059,642, which is a U.S. National Phase Application under 35 U.S.C. 371 of PCT International Application No. PCT/IL2009/000808, which has an international filing date of Aug. 17, 2009, and which claims the benefit of priority from Israel Patent Application No. 193,513, filed Aug. 18, 2008, whose disclosure is incorporated herein by reference.

BACKGROUND OF THE INVENTION

1. Field of the Invention

The present invention generally relates to the field of rubber recycling and more particularly, the invention pertains to producing devulcanized or reclaimed rubber from waste vulcanized rubber.

2. Description of the Related Art

Rubber products, such as automotive tires, are usually manufactured by processing (molding, extruding, calandering) and subsequent vulcanization of raw rubber materials. Generally, vulcanization is the chemical treatment of a rubber polymer molecules by cross-linking agent such as sulfur. The addition of sulfur and other special components provides desired physical properties of a final rubber product, such as strength, elasticity, durability etc. Vulcanized rubber is the source of one of the most serious waste product problems. The benefits achieved by vulcanization present a problem when attempting to recycle vulcanized rubber.

One of the common known approaches to recycling rubber waste is devulcanization that is intended to depolymerize rubber molecules or break the polysulfide linkages. Devulcanization techniques may include mechanical shear, high-energy radiation, chemical processing, thermo-mechanical processing, etc. In chemical terms, devulcanization means reverting rubber from its thermoset, elastic state back into a plastic, moldable state. This is accomplished by severing the sulfur bonds in the molecular structure. With the proper devulcanization method, a much higher percentage of waste rubber, including old tires can be re-used.

1. It has long been known that mere fine grinding, without any additives, brings about cleavage of sulfur bonds and formation of free radicals. Some early reclaiming processes e.g. disclosed in DE Pat. No. 4,425,049 used fine grinding at roller mill for this purpose. Later group of American and Japanese scientists found that this process occurs effectively in biaxial extruder at high temperatures that are disclosed in the following patents and patent application: U.S. Pat. No. 65,756,680; U.S. Pat. No. 6,590,042; U.S. Pat. Appl. No. US 2001025060. However, it was proved that such process is limited by adverse reaction of so-called "creeping re-vulcanization", see B. Adhikari, D. De et al. Reclamation and recycling of waste rubber. Progress in Polymer Science. 25, 2000. 909-948 and PCT patent application No. WO0129122. From the above reasoning it is clear that mechanical destruction only is not capable to provide y reclaimed rubber materials of appropriate quality.

Some traditional devulcanization methods use exposing cured rubber to elevated temperatures for an extended period of time, e.g. by applying superheated steam as disclosed in PCT patent application No. WO9920380. Also is known applying alkali and softeners as further disclosed in U.S. Pat. No. 4,161,464 and No. 5,798,394. However, this "digesting reclaim process" not only severs the sulfur bonds in the polymer matrix, but also breaks the polymer chains, causing a significant degradation of physical properties of the rubber. Due to questionable cost efficiency and environmental problems, thermal devulcanization is rarely used today.

Another technique uses prior swelling of cured material by solvents (mainly, butanol) in order to facilitate subsequent destruction of sulfide bonds as disclosed in U.S. Pat. Appl. No. US20020091167 and No. US20030225171. That technique requires removal of solvent and drying reclaimed material making entire process impractical.

Reclaimed materials based on rubber crumb with binders are also widely used for manufacturing simple articles (tiles, carpets, floors etc.). Usage of various binders in form of adhesives (such as polyurethane) and polymer additives (such as PP, EVA etc.) are disclosed in the following patents and patent application U.S. Pat. No. 5,397,825; PCT Pat. Appl. No. WO9948960; U.S. Pat. No. 5,303,661 and U.S. Pat. No. 4,378,067. Such reclaimed materials have limited usage due to poor physical properties thereof.

Various oxidizers for stabilization free radicals, formed in grinding process, have drawn attention of rubber chemists. Chlorine as oxidizing agent is used in technologies disclosed in U.S. Pat. No. 5,693,714; No. 5,506,283 and No. 5,438,078. Due to poor quality of reclaimed material and polluting effect of chlorination agent, this direction did not gain acceptance among industrialists.

Better physical properties of devulcanizate could be obtained by applying ozone as oxidizing agent as disclosed in LV patent No. LV13339B of Zagars. Unfortunately, grinding under ozone stream requires too complicated equipment, making this technology impracticable.

According to the following patents: U.S. Pat. No. 5,677,354; No. 5,798,394 and No. 5,891,926 devulcanization could be performed by applying some biotechnological reactions. These methods require complicated equipment, large floor space and excessive operating time.

Initially it was considered that cleavage of sulfide bonds occurs only at elevated temperature, but later it has been found that in the presence of amines and disulfides the devulcanization process accelerates sharply and even could be preformed at ambient temperature (see Krebs. Z. Anorg. Allg. Chemie. 276, 1954). This discovery has initiated a number of devulcanization technologies. One of them is represented in the following patent and patent applications: EP Pat. Appl. No. EP0690091 and U.S. Pat. No. 5,770,632 (both relate to so-called De-Link process). Other versions are disclosed in PCT Pat. Appl. No. WO2007062611 and WO0129121 and U.S. Pat. No. 6,924,319. The process gained wide acceptance due to simplicity of used standard equipment (roller mills). However, it was shown that sufficient disadvantages inhere to this technique. It requires fine grinding the cured rubber (up to 0.4 mm and less). Moreover, this method does not provide good selective action to different bonds and along with the attack of C—S and S—S bonds, it attacks also C—C bonds and initiates their deep destruction. This causes reduction of the physical and mechanical properties of secondary vulcanizate. According to these publications, secondary devulcanizate from tire scraps retains 62-70% of tensile strength as compared with primary vulcanizate.

Therefore, a need still exists for a method of devulcanization and chemical composition that provide efficient and simple devulcanization technique.

SUMMARY OF THE INVENTION

It is an object of the present invention to provide an economical and simple process for producing reclaimed rubber with minimal deteriorating the main properties. The entire previous reasoning brings out clearly that any technology aimed to high retention of initial properties of elastomers should not be restricted to mere mechanical disintegration. Any effective technology should contain chemical agents reducing the negative influence of related factors.

According to one broad aspect of the present invention, proposed is a method of reclaiming of a cured elastomer material, comprising the steps of:

a) mixing the cured elastomer in form of crumb or chips with a devulcanization-aiding chemical composition, b) applying a shear-stress deformation to said mixture; wherein said chemical composition comprises ingredients as follows:

first agent promoting scission of sulfide bonds of free radicals formed under the shear-stress deformation, which is selected from the following classes: of amines and sulfides and their derivatives;

(ii) second agent providing the pre-set acidity in the course of the process and thus inhibiting recombination of sulfide bonds, which is selected from the following classes: organic acids and their anhydrides;

(iii) third agent contributing to fast stabilization of the free radicals, which is selected from the class of oxidants;

(iv) fourth agent promoting redox reaction, which is selected from salts of metals with variable valence; and (v) fifth agent prevention agglomeration of said elastomer material after applying the shear-stress deformation and reduction of friction, which is selected from the class of polar sorbents.

Preferably, a weight percent ratio of said agents ranges as follows:

First agent—from about 20 to about 75%;
Second agent—from about 15 to about 70%;
Third agent—from about 3 to about 15%;
Fourth agent—from about 2 to about 10%;
Fifth agent—from about 0 to about 5%.

According to still another aspect of the present invention, applying shear-stress deformation is applied under controlled temperature, preferably it is ranging from about 40 degree to about 90 degree C.

The ratio of the devulcanization-aiding chemical composition to the cured elastomer preferably is from about 0.015 to about 0.05.

According to another broad aspect of the invention, proposed is a devulcanization-aiding chemical composition for obtaining a curable material from cured elastomer material, comprising:

(vi) first agent promoting scission of sulfide bonds of free radicals formed under a condition of shear-stress deformation, which is selected from the following classes: of amines and sulfides and their derivatives;

(vii) second agent providing the pre-set acidity in the course of devulcanization process and thus inhibiting recombination of sulfide bonds, which is selected from the following classes: organic acids and their anhydrides;

(viii) third agent contributing to fast stabilization of the free radicals, which is selected from the class of oxidants;

(ix) fourth agent promoting redox reaction, which is selected from salts of metals with variable valence; and (x) fifth agent preventing agglomeration of said elastomer material after applying the shear-stress deformation and reduction of friction, which is selected from the class of polar sorbents.

DETAILED DESCRIPTION OF THE PREFERRED EMBODIMENTS

Present invention based on understanding that technology aimed to high retention of initial properties of elastomers could not be restricted to mere mechanical disintegration or applying some devulcanization chemical agent only. Present invention based on providing shear-stress deformation during mechanical destruction of cured elastomer, e.g. rubber in form of rough crumb or chips in presence of devulcanization-aiding chemical composition reducing the negative influence of various related factors.

The choice of chemical composition is based on mechanism of rubber destruction.

Suggested mechanisms of destruction could be illustrated as follows:

a) Rupture of the main chain to yield radicals.

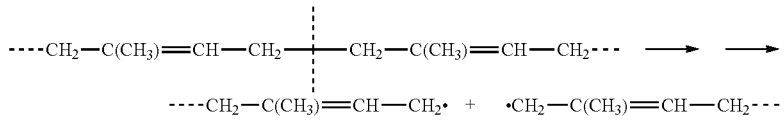

b) Fragments of main chain stabilize by taking on oxygen from the oxidants and/or from the air to the points of rupture.

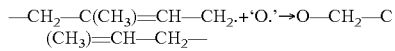

c) Destruction of polysulfide bonds proceeds by reaction.

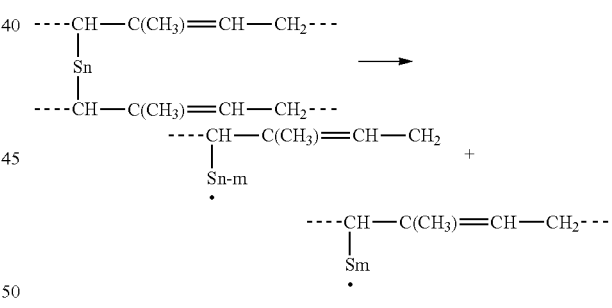

Radicals formed at reaction of disintegration are unstable, and hence reactions of stabilization proceed simultaneously. It was found that process of rupture of sulfide bonds is reversible. Recombination of the sulfide bonds occurs in the absence of preventing chemical agents by two alternative ways:

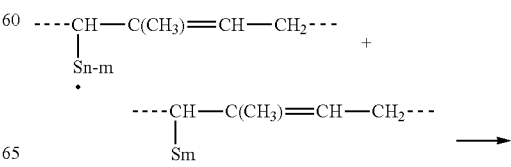

-continued
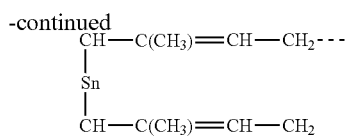

Vacant bonds may connect into the cyclic structure:

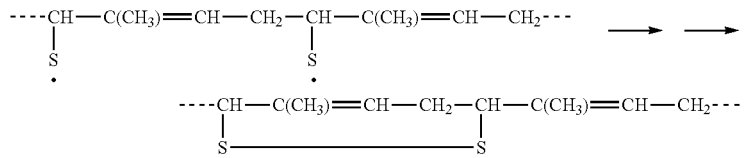

Recombination results in the so-called "creeping re-vulcanization".

Action of sulfide and disulfide derivatives as well as amine derivatives is explained by formation of intermediate compound with the polysulfide chain:

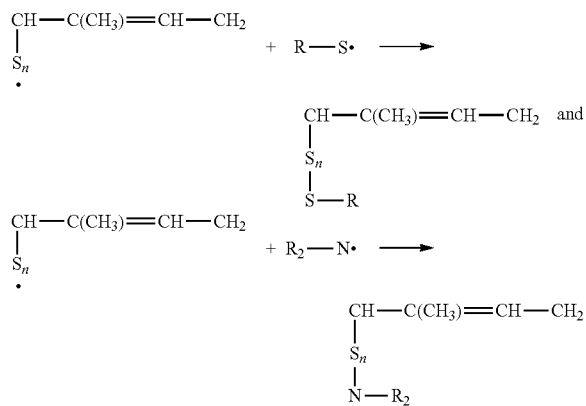

This reaction provides covering of free bonds and prevention from recombination.

It was found out by the inventor of the present invention that equimolar mixture of sulfide and amine derivatives is acting more effectively than individual sulfide or amine separately. This effect is presumably caused by formation of complex compound. To this end, equimolar mixture of sulfide and amine derivatives could be preferably chosen as component, which promotes scission of sulfide bonds of the radicals during fine grinding.

In accordance with general aspect of the present invention devulcanization-aiding chemical composition provides the following effects:

1. Promotion of scission of sulfide bonds of the radicals during fine grinding at substantially ambient temperatures.

It could be provided by incorporation substances, which promote scission of sulfide bonds of the radicals during fine grinding. These substances could be chosen from classes of sulfides and amines and their derivatives. Usage of complex compounds of sulfides and amines (adducts) in equimolar ratios are preferred.

2. Inhibiting recombination of sulfide bonds and preventing the adverse reaction of re-vulcanization.

It could be provided by incorporation substances, which are chosen from classes of organic acids and their anhydrides. Amount of acid could be defined by gradual addition of acid to devulcanization-aiding chemical composition until pH value of material water extract reach the preset value.

It could be done by using the following technique: adding 100 ml. of warm water to 10 gr. of mixture of rubber crumb with chemical composition, mixing thoroughly and keeping for 2 hours. Further, acidity of poured off water is measured by pH-meter or by litmus paper. Preferably pH of water extract should not exceed value of 0.6

Periodic measurement and thorough monitoring of pH during of devulcanization could be performed.

Preferably, dibasic organic acids could be used, since less amount of thereof is required in order to provide the same acidity.

Taking into account mechanism of reactions occurring in this process, hydroxy radical —OH is favorable to scission of sulfide bonds. To this end it is preferably to use hydroxy acids.

Thus, dibasic hydroxy organic acids, such as tartaric, malic (hydrosuccinic) acids are the most preferable.

2. Stabilization of free radicals formed in the course of comminuting by their oxidation. This effect could be provided by incorporation of substances, which are chosen from oxidants disposed to easy splitting off atomic oxygen at the temperatures of comminuting (40-80° C.). Oxidants such as zinc peroxide, benzoyl peroxide, dicumyl peroxide directly oxidize free bonds of the radicals.

3. Catalysis of the redox reaction.

This effect could be provided by incorporation of substances, which are chosen from substances, which catalyze redox reaction and thus aid to stabilization of free radicals at ambient temperatures. While oxidants directly oxidize free bonds of the radicals, hydroxy acids—for example, tartaric acid—enter into exchange reaction with radicals. Oxides or salts of metals with variable valence—iron oxides, manganese (IV) oxide and similar act as catalysts of oxidation process and serve to this target best.

4. Prevention of agglomeration of particles and reduction of friction.

This effect could be provided by incorporation of substances, facilitating to fine disintegration of rubber vulcanizate and preventing agglomeration of fine-ground rubber crumb. The less is particle size, the more its surface is developed and the more distinct is agglomeration. Agglomerated powder loses its granular properties and consists from flimsy blocks. Polar sorbents, capable to dispersion in rubber, suit to this destination best. Besides, polar sorbents are capable for adsorption of accelerators at temperatures of processing and release them at temperature of vulcanization. By this way, they do not affect properties of rubber compounds. Preferably, zeolites with particles size 1-5 mkm could bee used as sorbents.

It should be noted that two or possibly even more above-mentioned effect could be provided by one component of chemical composition. For example $Fe_3O_4$ could provide both catalysis of the redox reaction and prevention agglomeration of particles and reduction of friction. Preferably, Fe$_3$O$_4$ produced for using as a bio-pigment with particles size 30-40 mkm, and commercially available from Israeli company BIOPIGMENT could be used for those purposes.

Preferably, a weight percent ratio of said said agents ranges as follows:

First agent—from about 20 to about 75%;
Second agent—from about 15 to about 70%;
Third agent—from about 3 to about 15%;
Fourth agent—from about 2 to about 10%;
Fifth agent—from about 0 to about 5%.

Devulcanization-aiding chemical composition could be prepared before processing and mixed with rubber crumb or chips using common known techniques. Otherwise, ingredients of chemical composition could be mixed directly with rubber to be processed.

Preferably, weight percent ratio of Devulcanization-aiding chemical composition to rubber to be processed ranges from about 0.015 to about 0.05.

Devulcanization process in accordance with present invention preferably performed under temperature regimes closed to substantially ambient temperatures, e.g. 40-90° C.

In case of exceeding temperatures applying cooling, e.g. water based is desired. If temperature is not exceed 120° C., it is possible not to apply cooling.

In order to understand the invention and to see how it may be carried out in practice, preferred embodiments will now be described, by way of non-limiting examples only.

Example 1

Cured rubber crumb from whole tires ground to pieces 3-7 mm in size and separated from metal and fiber was used as raw material for this embodiment.

Devulcanization-aiding chemical composition was prepared by formulation:

Adduct prepared by mixing mercaptobenzothiazodisulphide (MBTS) with diphenylguanidine (DPG) in equimolar ratio (66.2/33.8 weight percent)—1.4 w.p.
Iron oxide Fe$_3$O$_4$—0.25 w.p.
Zeolite—0.1 w.p.
Zinc peroxide ZnO$_2$—0.15 w.p.
Malic (hydroxysuccinic) acid—added until pH of the water extract of the agent is reached the value 0.3. It was found that in this example 2.2 w.p. of acid is needed to fulfill this condition.

Chemical agent was mixed with raw rubber material by ratio: rubber crumb—100 w.p.; chemical agent—4.1 w.p.

The process was carried out by 40 passes of the mixture rubber with agent through the nip 0.2 mm of the standard 2-roll mill at controllable temperatures 40-90° C.

The process is accomplished at controlled acidity and contents of water extractable components in the mixture.

Dynamics of variation pH in the process of devulcanization in the presence of Devulcanization-aiding chemical composition on the base of tartaric acid is given in the table.

TABLE

| Stage of process | pH | Contents of water extractable components |
|---|---|---|
| Initial rubber crumb | 7.0 | 0.6% |
| Mixture of crumb with chemical agent | 0.3 | 3.1% |
| After pass #1 | 5.2 | 1.6% |
| After pass #4 | 5.5 | 0.9% |
| After pass #7 | 6.0 | 0.6% |
| After pass #10 | 6.3 | 0.6% |
| Just after pass #40 | 6.5 | 0.6% |
| Devulcanized material after 2 hours storage | 5.0 | 0.6% |

Example 2

Rubber tread buffing pure from metal and fiber was used as raw material for this embodiment. Devulcanization-aiding chemical composition was prepared by formulation:

Adduct prepared by mixing mercaptobenzothiazol (MBT) with hexamethylenetetramine (HMTA) in equimolar ratio (53/47 weight percent)—1.3 w.p.
Iron oxide Fe$_3$O$_4$—0.3 w.p.
Dicumylperoxide—0.2 w.p.
Zinc peroxide ZnO$_2$—0.3 w.p.
Tartaric acid—added until pH of the water extract of the agent is reached the value 0.4. It was found that in this example 1.8 w.p. of acid is needed to fulfill this condition.

Devulcanization-aiding chemical composition was mixed with raw rubber material by ratio: rubber tread buffing—100 w.p.; chemical agent—3.9 w.p.

The process was carried out by applying shear-stress deformation during mechanical disintegration on the mixture of rubber with Devulcanization-aiding chemical composition.

The process is accomplished at controlled acidity of water extract.

Values pH of water extract measured in the beginning was found as 0.4; the same measured in the end of process of devulcanization was found as 5.2.

The compound was prepared on base on reclaimed material by formulation:

Reclaimed material—50 w.p.; NR—100 w.p.; Sulfur—3.5 w.p.; ZnO—5 w.p.; Stearic acid—1 w.p.

Samples were cured at temperature 155° C. during 12 min.

Testing has shown properties: Tensile Strength—24.5 MPa; Elongation at break—477%.

Example 3

Cured rubber rejects from production of plumbing and sealing fixtures were used as raw material for this embodiment.

Devulcanization-aiding chemical composition was prepared by formulation:

Adduct prepared by mixing N-cyclohexyl-2-benzothiazole sulfenamide (CBS) with hexamethylenetetramine (HMTA) in equimolar ratio (60.4/39.6 weight percent)—1.4 w.p.
Iron oxide Fe$_3$O$_4$—0.2 w.p.
Dibenzylperoxide—0.2 w.p.
Manganese (IV) oxide MnO$_2$—0.05 w.p.
Oxalic acid dihydrate—added until pH of the water extract of the agent is reached the value 0.5. It was found that in this example 1.4 w.p. of acid is needed to fulfill this condition.
Zeolites—0.3 w.p.

Devulcanization-aiding chemical composition was mixed with raw rubber material by ratio: rubber tread buffing—100 w.p.; chemical agent—2.2 w.p.

The process was carried out by applying shear-stress deformation during mechanical disintegration on the mixture of rubber with devulcanization-aiding chemical composition.

The process is accomplished at controlled acidity of water extract.

Values pH of ground crumb measured in the beginning was found as 0.3; the same measured in the end of process of devulcanization was found as 5.1.

The compound was prepared on base on reclaimed material by formulation:

Reclaimed material—50 w.p.; NR—100 w.p.; Sulfur—2.5 w.p.; ZnO—5 w.p.; Stearic acid—1 w.p.

Samples were cured at temperature 1550 C during 12 min.

Testing has shown properties: Tensile Strength—18.1 MPa; Elongation at break—465%.

Those skilled in the art will readily appreciate that various modifications and changes can be applied to the embodiments of the invention as hereinbefore exemplified.

What is claimed is:

1. A method of reclaiming of a cured elastomer material, comprising the steps of:
    a) mixing said cured elastomer in form of crumbs or chips with a devulcanization-aiding chemical composition, and
    b) devulcanizing said cured material by applying a shear-stress deformation to said mixture of the crumbs or chips with a devulcanization-aiding chemical while performing a mechanical disintegration of the cured elastomer into fine-ground crumbs wherein said chemical composition comprises ingredients as follows:
        (i) a first agent which is selected from the classes of complex compounds formed from amines and sulfides in equimolar ratio;
        (ii) a second agent which is selected from the classes of organic acids containing an hydroxy radical;
        (iii) a third agent selected from the class of oxidants, and
        (iv) a fourth agent selected from oxides of metals with variable valence.

2. A method according to claim 1, wherein a weight percent ratio of said agents ranges as follows: said first agent from about 20 to about 75%; said second agent from about 15 to about 70%; said third agent from about 3 to about 15%; and said fourth agent from about 2 to about 15%.

3. A method according to claim 1, wherein ratio of the devulcanization-aiding chemical composition to said cured elastomer is from about 0.015 to about 0.05.

4. A method according to claim 1, wherein the organic acids of said second agent are mono- and dibasic organic acids.

5. A method according to claim 1, wherein the organic acids of said second agent are acids containing hydroxy radical.

6. A method according to claim 1, wherein said third agent are peroxides characterized by easily splitting off atomic oxygen.

7. A method according to claim 1, wherein said variable valence metals are iron and manganese.

8. A method according to claim 1, wherein the fourth agent comprises oxide $Fe_3O_4$.

9. A method according to claim 8, wherein said oxide $Fe_3O_4$ is used in a form of fine powder.

10. A method according to claim 8, wherein said oxide $Fe_3O_4$ is characterized by particles size from about 30 to about 40 mkm.

11. A method according to claim 1 wherein said chemical composition further comprising a fifth agent selected from the class of polar sorbents.

12. A method according to claim 11 wherein said fifth agent comprised with a weight percent ratio from about 0 to about 5%.

13. A method according to claim 1 wherein said cured elastomer material comprising a range of crumbs or chips sizes of few mm.

14. A method according to claim 13 wherein said cured elastomer material comprising a range of crumbs or chips sizes of about 0.5 mm to 7 mm.

15. A devulcanization-aiding chemical composition for obtaining a curable material from cured elastomer material by applying a mechanical disintegration, said composition comprising at least four agents with following weight percent ratio:
    a first agent from about 20% to about 75% selected from the classes of complex compounds formed from amines and sulfides in equimolar ratio;
    a second agent from about 15% to about 70% selected from the classes of organic acids containing an hydroxy radical;
    a third agent from about 3% to about 15% selected from the class of oxidants; and
    a fourth agent from about 2% to about 15% selected from oxides of metals with variable valence.

16. A chemical composition according to claim 15, wherein the organic acids of said second agent are mono- and dibasic organic acids.

17. A chemical composition according to claim 15, wherein the organic acids of said agent are acids containing hydroxy radical.

18. A chemical composition according to claim 15, wherein said fourth agent comprises oxide $Fe_3O_4$.

19. A chemical composition according to claim 15 further comprising a fifth agent selected from the class of polar sorbents.

20. A chemical composition according to claim 19, wherein said fifth agent comprised with a weight percent ratio from about 0 to about 5%.

* * * * *